(12) United States Patent
Li et al.

(10) Patent No.: US 10,754,107 B2
(45) Date of Patent: Aug. 25, 2020

(54) COUPLING DEVICE HAVING A STRUCTURED REFLECTIVE SURFACE OF STAMPED MALLEABLE METAL FOR COUPLING INPUT/OUTPUT OF AN OPTICAL FIBER

(71) Applicant: NANOPRECISION PRODUCTS, INC., Camarillo, CA (US)

(72) Inventors: Shuhe Li, Pasadena, CA (US); Robert Ryan Vallance, Newbury Park, CA (US); King-Fu Hii, Camarillo, CA (US); Michael K. Barnoski, Pacific Palisades, CA (US)

(73) Assignee: CUDOQUANTA FLORIDA, INC., Sarasota, FL (US)

( * ) Notice: Subject to any disclaimer, the term of this patent is extended or adjusted under 35 U.S.C. 154(b) by 0 days.

(21) Appl. No.: 16/450,746

(22) Filed: Jun. 24, 2019

(65) Prior Publication Data
US 2020/0049907 A1    Feb. 13, 2020

Related U.S. Application Data

(63) Continuation of application No. 15/668,670, filed on Aug. 3, 2017, now abandoned, which is a (Continued)

(51) Int. Cl.
*G02B 6/42*     (2006.01)
*G02B 6/26*     (2006.01)
*B21D 22/00*    (2006.01)

(52) U.S. Cl.
CPC .......... *G02B 6/4214* (2013.01); *B21D 22/00* (2013.01); *G02B 6/262* (2013.01); *G02B 6/4243* (2013.01);
(Continued)

(58) Field of Classification Search
CPC .. G02B 6/4214; G02B 6/4243; G02B 6/4263; G02B 6/4295; G02B 6/262; G02B 6/4206; B21D 22/00
See application file for complete search history.

(56) References Cited

U.S. PATENT DOCUMENTS 4,413,881 A * 11/1983 Kovats ................. G02B 6/4428
                                                        228/124.6
4,767,340 A *  8/1988 Hohorst ............... H01R 13/501
                                                        439/729

(Continued)

*Primary Examiner* — Andrew Jordan
(74) *Attorney, Agent, or Firm* — Liu & Liu

(57) ABSTRACT

A process of making a coupling device for physically and optically coupling an optical fiber to route optical signals to/from optical receiver/transmitter. The coupling device includes a structured reflective surface that functions as an optical element that directs light to/from the input/output ends of the optical fiber by reflection, and an optical fiber retention groove structure that positively receives the optical fiber in a manner with the end of the optical fiber at a defined distance to and aligned with the structured reflective surface. The open structure of the structured reflective surface and fiber retention structure lends itself to mass production processes such as precision stamping. The coupling device can be attached to an optical transmitter and/or receiver, with the structured reflective surface aligned to the light source in the transmitter or to the detector in the receiver, and adapted in an active optical cable.

18 Claims, 9 Drawing Sheets

Related U.S. Application Data continuation of application No. 15/135,464, filed on Apr. 21, 2016, now abandoned, which is a continuation of application No. 13/786,448, filed on Mar. 5, 2013, now abandoned.

(60) Provisional application No. 61/606,885, filed on Mar. 5, 2012.

(52) U.S. Cl.
CPC ......... *G02B 6/4263* (2013.01); *G02B 6/4295* (2013.01); *G02B 6/4206* (2013.01)

(56) References Cited

U.S. PATENT DOCUMENTS

| | | | | |
|---|---|---|---|---|
| 4,871,224 A * | | 10/1989 | Karstensen | G02B 6/43 385/14 |
| 4,904,036 A * | | 2/1990 | Blonder | G02B 6/30 257/E25.032 |
| 4,992,704 A * | | 2/1991 | Stinson | H05B 45/20 315/312 |
| 5,163,113 A * | | 11/1992 | Melman | G02B 6/4202 385/31 |
| 5,479,540 A * | | 12/1995 | Boudreau | G02B 6/4231 385/14 |
| 5,500,910 A * | | 3/1996 | Boudreau | G02B 6/2706 385/10 |
| 5,548,677 A * | | 8/1996 | Kakii | G02B 6/262 385/92 |
| 5,577,142 A * | | 11/1996 | Mueller-Fiedler | G02B 6/4214 385/131 |
| 5,606,181 A * | | 2/1997 | Sakuma | B41J 2/451 257/79 |
| 5,611,008 A * | | 3/1997 | Yap | G02B 6/423 385/14 |
| 5,911,022 A * | | 6/1999 | Plickert | G02B 6/4249 385/49 |
| 6,004,046 A * | | 12/1999 | Sawada | G02B 6/4248 385/92 |
| 6,276,840 B1 * | | 8/2001 | Weiss | G02B 6/3831 385/59 |
| 6,285,043 B1 * | | 9/2001 | Yap | G02B 6/4232 257/81 |
| 6,402,394 B1 * | | 6/2002 | Heinrich | G02B 6/4246 385/14 |
| 6,456,766 B1 * | | 9/2002 | Shaw | G02B 6/30 385/47 |
| 6,516,115 B1 * | | 2/2003 | Fujita | G02B 6/4214 385/31 |
| 6,603,148 B1 * | | 8/2003 | Sano | H01L 23/3107 257/98 |
| 6,637,947 B2 * | | 10/2003 | Melchior | G02B 6/4214 385/31 |
| 6,643,446 B2 * | | 11/2003 | Moidu | G02B 6/4248 385/138 |
| 6,712,527 B1 * | | 3/2004 | Chan | G02B 6/4201 385/88 |
| 6,719,927 B2 * | | 4/2004 | Sakurai | G02B 6/3885 264/1.25 |
| 6,757,308 B1 * | | 6/2004 | Eldring | H01S 5/02284 372/109 |
| 6,788,873 B2 * | | 9/2004 | Fritz | G02B 6/4248 385/138 |
| 6,870,976 B2 * | | 3/2005 | Chen | G02B 6/29367 264/1.1 |
| 6,920,276 B2 * | | 7/2005 | Sakurai | G02B 6/3636 156/294 |
| 6,960,032 B2 * | | 11/2005 | Eldring | H01S 5/02284 385/49 |
| 7,058,275 B2 * | | 6/2006 | Sezerman | G02B 6/3636 385/114 |
| 7,189,007 B2 * | | 3/2007 | Imanbayev | G02B 6/3644 385/31 |
| 7,198,416 B2 * | | 4/2007 | Ray | G02B 6/4206 385/33 |
| 7,298,941 B2 * | | 11/2007 | Palen | G02B 6/4206 264/1.1 |
| 7,311,449 B2 * | | 12/2007 | Barnoski | G02B 6/3834 385/78 |
| 7,317,181 B2 * | | 1/2008 | Murakami | H01L 24/97 250/214.1 |
| 7,335,522 B2 * | | 2/2008 | Wang | H01L 25/0753 257/E25.02 |
| 7,343,770 B2 * | | 3/2008 | Barnoski | B21D 28/02 100/214 |
| 7,404,679 B2 * | | 7/2008 | Ebbutt | G02B 6/3644 385/31 |
| 7,428,351 B2 * | | 9/2008 | Jenkins | G02B 6/122 385/129 |
| 7,499,288 B2 * | | 3/2009 | Tanaka | H01L 33/486 361/760 |
| 7,520,682 B2 * | | 4/2009 | Eom | G02B 6/4201 385/89 |
| 7,528,414 B2 * | | 5/2009 | Huang | H01L 33/483 257/100 |
| 7,771,093 B2 * | | 8/2010 | Kishikawa | H01L 33/483 362/296.07 |
| 7,800,734 B2 * | | 9/2010 | Komatsuda | G02B 27/0927 355/52 |
| 7,832,944 B2 * | | 11/2010 | Hosking | G02B 6/4201 361/831 |
| 7,959,975 B2 * | | 6/2011 | Millward | B82Y 10/00 427/256 |
| 8,067,884 B2 * | | 11/2011 | Li | C09K 11/0883 313/501 |
| 8,101,955 B2 * | | 1/2012 | Keh | H01L 33/486 257/433 |
| 8,174,100 B2 * | | 5/2012 | Yong | H01L 33/62 257/676 |
| 8,186,892 B2 * | | 5/2012 | Hosking | G02B 6/4201 361/831 |
| 8,188,498 B2 * | | 5/2012 | Kim | H01L 33/505 257/98 |
| 8,215,850 B2 * | | 7/2012 | Yalamanchili | G02B 6/4248 385/138 |
| 8,342,756 B2 * | | 1/2013 | Moidu | G02B 6/4248 385/137 |
| 8,434,872 B2 * | | 5/2013 | Maekawa | G02B 30/56 353/10 |
| 8,488,244 B1 * | | 7/2013 | Li | G02B 27/1006 359/618 |
| 8,540,437 B2 * | | 9/2013 | Lee | G02B 6/4215 385/93 |
| 8,710,525 B2 * | | 4/2014 | Takahashi | H01L 33/486 257/98 |
| 8,909,058 B2 * | | 12/2014 | Sheu | H04B 10/40 398/138 |
| 8,936,403 B2 * | | 1/2015 | Howard | G02B 6/3829 385/89 |
| 8,961,034 B2 * | | 2/2015 | Li | G02B 6/3858 385/65 |
| 8,971,678 B2 * | | 3/2015 | Nakano | G02B 6/4236 385/14 |
| 9,011,025 B2 * | | 4/2015 | McColloch | G02B 6/4246 385/94 |
| 9,112,330 B2 * | | 8/2015 | Gronenborn | G02B 19/0057 |
| 9,213,148 B2 * | | 12/2015 | Li | G02B 6/3636 |
| 9,235,014 B2 * | | 1/2016 | Wang | G02B 6/4214 |
| 9,285,544 B2 * | | 3/2016 | Panotopoulos | G02B 6/4231 |
| 9,297,972 B2 * | | 3/2016 | Logan, Jr. | G02B 6/4284 |
| 9,400,360 B2 * | | 7/2016 | McColloch | G02B 6/4246 |
| 9,851,511 B2 * | | 12/2017 | Li | G02B 6/3821 |
| 9,864,145 B2 * | | 1/2018 | Dannenberg | H04J 14/02 |
| 9,880,366 B2 * | | 1/2018 | Vallance | G02B 6/4251 |
| 9,983,414 B2 * | | 5/2018 | McColloch | G02B 27/62 |
| 10,025,043 B2 * | | 7/2018 | Vallance | G02B 6/4249 |
| 10,222,553 B2 * | | 3/2019 | Dannenberg | G02B 6/29367 |

(56) References Cited

U.S. PATENT DOCUMENTS

| Patent/Publication No. | Date | Inventor | Classification |
|---|---|---|---|
| 10,241,275 B2* | 3/2019 | Li | G02B 6/4214 |
| 10,274,683 B2* | 4/2019 | Li | G02B 6/3821 |
| 10,520,680 B2* | 12/2019 | Li | G02B 6/3838 |
| 10,598,873 B2* | 3/2020 | Vallance | G02B 6/124 |
| 2002/0110328 A1* | 8/2002 | Bischel | G02B 6/4201 385/49 |
| 2003/0118288 A1* | 6/2003 | Korenaga | G02B 6/42 385/49 |
| 2003/0142920 A1* | 7/2003 | Dallas | G02B 6/3839 385/80 |
| 2004/0005119 A1* | 1/2004 | Han | G02B 6/42 385/49 |
| 2004/0091215 A1* | 5/2004 | Barnoski | B21D 28/02 385/78 |
| 2004/0091268 A1* | 5/2004 | Hogan | H04B 10/40 398/117 |
| 2004/0114877 A1* | 6/2004 | Barnoski | G02B 6/3834 385/78 |
| 2005/0069013 A1* | 3/2005 | Bhandarkar | G02B 6/4204 372/102 |
| 2005/0089262 A1* | 4/2005 | Jenkins | G02B 6/122 385/14 |
| 2005/0201694 A1* | 9/2005 | Rosinski | G02B 6/4214 385/92 |
| 2005/0201711 A1* | 9/2005 | Koh | G02B 6/3801 385/137 |
| 2006/0239612 A1* | 10/2006 | De Dobbelaere | G02B 6/42 385/37 |
| 2007/0003195 A1* | 1/2007 | Ice | G02B 6/4201 385/92 |
| 2007/0165980 A1* | 7/2007 | Jenkins | G02B 6/122 385/14 |
| 2007/0172175 A1* | 7/2007 | Imanbayev | G02B 6/3839 385/78 |
| 2008/0247712 A1* | 10/2008 | Hogen | G02B 6/4201 385/92 |
| 2009/0074959 A1* | 3/2009 | Sezerman | C03C 13/041 427/163.2 |
| 2010/0006784 A1* | 1/2010 | Mack | H04B 10/503 250/551 |
| 2010/0238660 A1* | 9/2010 | Miyairi | F21V 7/0008 362/235 |
| 2010/0253949 A1* | 10/2010 | Adler | A61B 5/0066 356/479 |
| 2010/0278485 A1* | 11/2010 | Nakagawa | B29D 11/0075 385/38 |
| 2011/0013866 A1* | 1/2011 | Rosenberg | G02B 6/0096 385/14 |
| 2011/0182550 A1* | 7/2011 | Flanders | A61B 5/0066 385/50 |
| 2012/0170310 A1* | 7/2012 | Bita | G02B 6/0065 362/606 |
| 2013/0044362 A1* | 2/2013 | Commander | B42D 25/355 359/291 |
| 2013/0148966 A1* | 6/2013 | Kurokawa | H04J 14/02 398/65 |
| 2013/0148969 A1* | 6/2013 | Sheu | H04B 10/40 398/79 |
| 2013/0155642 A1* | 6/2013 | McColloch | G02B 6/4246 361/820 |
| 2013/0294732 A1* | 11/2013 | Li | G02B 6/4263 385/83 |
| 2013/0301986 A1* | 11/2013 | Nakano | G02B 6/4236 385/31 |
| 2013/0322818 A1* | 12/2013 | Li | G02B 6/4243 385/31 |
| 2014/0072311 A1* | 3/2014 | Giziewicz | G02B 6/4214 398/135 |
| 2014/0112668 A1* | 4/2014 | McColloch | G02B 27/62 398/135 |
| 2014/0205246 A1* | 7/2014 | Li | G02B 6/3636 385/83 |
| 2014/0248057 A1* | 9/2014 | Li | G02B 6/29365 398/82 |
| 2015/0050019 A1* | 2/2015 | Sengupta | H04J 14/04 398/44 |
| 2015/0124336 A1* | 5/2015 | Kaufman | G01J 3/0205 359/728 |
| 2015/0338585 A1* | 11/2015 | Li | G02B 6/4214 385/31 |
| 2015/0355420 A1* | 12/2015 | Li | G02B 6/3648 385/35 |
| 2016/0016218 A1* | 1/2016 | Li | G02B 6/4243 385/137 |
| 2016/0161686 A1* | 6/2016 | Li | G02B 6/4214 385/92 |
| 2016/0195677 A1* | 7/2016 | Panotopoulos | G02B 6/4214 250/227.23 |
| 2016/0238803 A1* | 8/2016 | Li | G02B 6/4295 |
| 2016/0238804 A1* | 8/2016 | Li | G02B 6/4263 |
| 2016/0274310 A1* | 9/2016 | Li | G02B 6/3821 |
| 2016/0274318 A1* | 9/2016 | Vallance | G02B 6/4214 |
| 2016/0320568 A1* | 11/2016 | Haase | G02B 6/4204 |
| 2016/0377821 A1* | 12/2016 | Vallance | G02B 6/4248 385/28 |
| 2017/0131474 A1* | 5/2017 | Dannenberg | H04J 14/02 |
| 2017/0131492 A1* | 5/2017 | Vallance | G02B 6/3881 |
| 2017/0131532 A1* | 5/2017 | Dannenberg | F24S 23/79 |
| 2017/0299824 A1* | 10/2017 | Vallance | G02B 6/4225 |
| 2018/0066810 A1* | 3/2018 | Lentine | G02B 19/0028 |
| 2018/0081123 A1* | 3/2018 | Li | G02B 6/383 |
| 2018/0081132 A1* | 3/2018 | Li | G02B 6/4243 |
| 2018/0128992 A1* | 5/2018 | Li | G02B 6/3885 |
| 2018/0136411 A1* | 5/2018 | Li | G02B 6/3821 |
| 2018/0149817 A1* | 5/2018 | Vallance | H04B 10/501 |
| 2018/0329146 A1* | 11/2018 | Dannenberg | H04J 14/02 |
| 2019/0137705 A1* | 5/2019 | Vallance | G02B 6/4214 |
| 2019/0219771 A1* | 7/2019 | Li | G02B 6/383 |
| 2019/0391345 A1* | 12/2019 | Li | G02B 6/3648 |
| 2019/0391346 A1* | 12/2019 | Vallance | G02B 6/4214 |
| 2020/0003974 A1* | 1/2020 | Vallance | H04B 10/501 |
| 2020/0049907 A1* | 2/2020 | Li | G02B 6/262 |
| 2020/0116960 A1* | 4/2020 | Vallance | G02B 6/3838 |
| 2020/0124798 A1* | 4/2020 | Chen | G02B 6/3839 |
| 2020/0124804 A1* | 4/2020 | Chen | G02B 6/3839 |

\* cited by examiner

Tx, Ty, Tz, θz alignment stage

COUPLING DEVICE HAVING A STRUCTURED REFLECTIVE SURFACE OF STAMPED MALLEABLE METAL FOR COUPLING INPUT/OUTPUT OF AN OPTICAL FIBER

PRIORITY CLAIM

This application is a continuation of U.S. patent application Ser. No. 15/668,670 filed on Aug. 3, 2017, which is a continuation of U.S. patent application Ser. No. 15/135,464 filed on Apr. 21, 2016, which is a continuation of U.S. patent application Ser. No. 13/786,448 filed on Mar. 5, 2013, which claims the priority of U.S. Provisional Patent Application No. 61/606,885 filed on Mar. 5, 2012. These applications are fully incorporated by reference as if fully set forth herein. All publications noted below are fully incorporated by reference as if fully set forth herein.

BACKGROUND OF THE INVENTION

2. Field of the Invention

The present invention relates to fiber optic signal transmission, in particular a device for physically and optically coupling an optical fiber for routing optical signals.

3. Description of Related Art

Given the increasing bandwidth requirements for modern day data transmission (e.g., for high definition video data), fiber optic signal transmissions have become ubiquitous for communicating data. Optical signals are transmitted over optical fibers, through a network of optical fibers and associated connectors and switches. The optical fibers demonstrate a significantly higher bandwidth data transmission capacity and lower signal losses compared to copper wires for a given physical size/space.

In fiber optic signal transmission, conversions of optical signals and electrical signals take place beyond the terminating end of the optical fiber. Specifically, at the output end of an optical fiber, light from the optical fiber is detected by a transducing receiver and converted into an electrical signal for further data processing downstream (i.e., optical-to-electrical conversion). At the input end of the optical fiber, electrical signals are converted into light to be input into the optical fiber by a transducing transmitter (i.e., electrical-to-optical conversion).

To couple the input/output of the optical fiber to the transmitter/receiver, optical elements such as lenses are required to collimate and/or focus light from a light source (e.g., a laser) into the input end of the optical fiber, and to collimate and/or focus light from the output end of the optical fiber to a photo diode detector. To achieve acceptable signal levels, optical fibers must be precisely aligned at high tolerance to the transmitters and receivers, so that the optical fibers are precisely aligned to the optical elements supported with respect to the transmitters and receivers. In the past, given the internal optical elements and structures needed to achieve the required optical alignments, the transmitters and receivers are provided with coupling structures having connection ports to which optical fibers are coupled using connectors terminating the optical fibers. Given optical fibers are brittle, they must be handled with care during and after physical connection to the transmitter and receiver structures. The transmitters and receivers and associated structures having the connection ports are therefore generally bulky, which take up significant space, thereby making them not suitable for use in smaller electronic devices. Heretofore, the coupling structure for optical fibers and transmitters and receivers are generally quite expensive and comparatively large in size for a given port count.

The above noted drawbacks of existing fiber optic data transmission are exacerbated in multi-channel fiber transmission. The connection and optical alignment of the optical fibers with respect to the transmitters and receivers must be assembled and the components must be fabricated with sub-micron precision. As if parts with such precision levels were not challenging enough, for the parts to be economical produced, it should be done in a fully automated, high-speed process.

What is needed is an improved structure for physically and optically coupling input/output of an optical fiber, which improves manufacturability, ease of use, functionality and reliability at reduced costs.

SUMMARY OF THE INVENTION

The present invention provides a coupling device for physically and optically coupling an input/output end of an optical fiber for routing optical signals. The device may be implemented for physically and optically coupling an optical fiber to an optical receiver and/or transmitter, which improves manufacturability, ease of use and reliability at reduced costs, thereby overcomes many of the drawbacks of the prior art structures.

According to the present invention, the coupling device includes a structured surface that functions as an optical element that directs light to/from the input/output ends of the optical fiber by reflection (which may also include deflection and diffraction of incident light). The coupling device also includes an optical fiber retention structure, which securely and accurately aligns the optical fiber with respect to the structured reflective surface. In one embodiment, the fiber retention structure includes at least one groove (or one or more grooves) that positively receives the optical fiber in a manner with the end of the optical fiber at a defined distance to and aligned with the structured reflective surface. The location and orientation of the structured reflective surface is fixed in relation to the fiber retention structure. In one embodiment, the fiber retention structure and the structured reflective surface are defined on the same (e.g., monolithic) structure of the coupling device. In an alternate embodiment, the fiber retention structure and the structure reflective surface are defined on separate structures that are coupled together to form the coupling device.

The structured reflective surface may be configured to be flat, concave or convex. In one embodiment, the structured reflective surface has a smooth surface with mirror finish. It may instead be a textured surface that is reflective. The structured reflective surface may have a uniform surface characteristic, or varying surface characteristics, such as varying degree of smoothness and/or textures, or a combination of various regions of smooth and textured surfaces making up the structured reflective surface. The structured reflective surface may have a surface profile and/or optical characteristic corresponding to at least one of the following equivalent optical element: mirror, focusing lens, diverging lens, diffraction grating, or a combination of the foregoing. The structure reflective surface may have more than one region corresponding to a different equivalent optical element (e.g., a central region that is focusing surrounded by an annular region that is diverging). In one embodiment, the structured reflective surface is defined on an opaque material that does not transmit light through the surface.

In one aspect of the present invention, the structured reflective surface and fiber retention structure are defined by an open structure, which lends itself to mass production processes such as stamping, which are low cost, high throughput processes. In one embodiment, the structured reflective surface and the fiber retention grooves are formed by stamping a metal material. In one embodiment, the metal material may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Alternatively, the material may be a hard plastic or other hard polymeric material.

In one embodiment, the coupling device may be attached to an optical transmitter and/or receiver, with the structured reflective surface aligned to the light source (e.g., a laser) in the transmitter or to the detector (e.g., a photo diode) in the receiver. The transmitter/receiver may be hermetically sealed to the coupling device. The transmitter/receiver may be provided with conductive contact pads for electrical coupling to external circuitry. Given the fixed structured reflective surface and the fiber retention structure are precisely defined on the same coupling device, by aligning the light source in the transmitter or the light detector in the receiver to the structured reflective surface in the coupling device, the light source/detector would be precisely aligned to the input/output end of the optical fiber. In one embodiment, a method of precise alignment of the transmitter/receiver to the coupling device comprises superimposing complementary alignment marks provided on the transmitter/receiver and the coupling device.

In another aspect of the present invention, an optical fiber is structured as an active optical cable (AOC), which is a cable known in the art to have a transmitter at one terminal end of the optical fiber for electrical-to-optical conversion, and a receiver at another terminal end of the optical fiber for optical-to-electrical conversion.

The coupling device in accordance with the present invention overcomes many of the deficiencies of the prior art, which provides ease of use and high reliability with low environmental sensitivity, and which can be fabricated at low cost. The inventive coupling device may be configured to support a single or multiple fibers, for optical input, optical output or both (for bi-directional data communication).

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a coupling device for physically and optically coupling an input/output end of an optical fiber for routing optical signals. The device may be implemented for physically and optically coupling an optical fiber to an optical receiver and/or transmitter, which improves manufacturability, ease of use and reliability at reduced costs, thereby overcomes many of the drawbacks of the prior art structures. According to the present invention, the coupling device includes a structured surface that functions as an optical element that directs light to/from the input/output ends of the optical fiber by reflection (which may also include deflection and diffraction of incident light).

Figure 1:
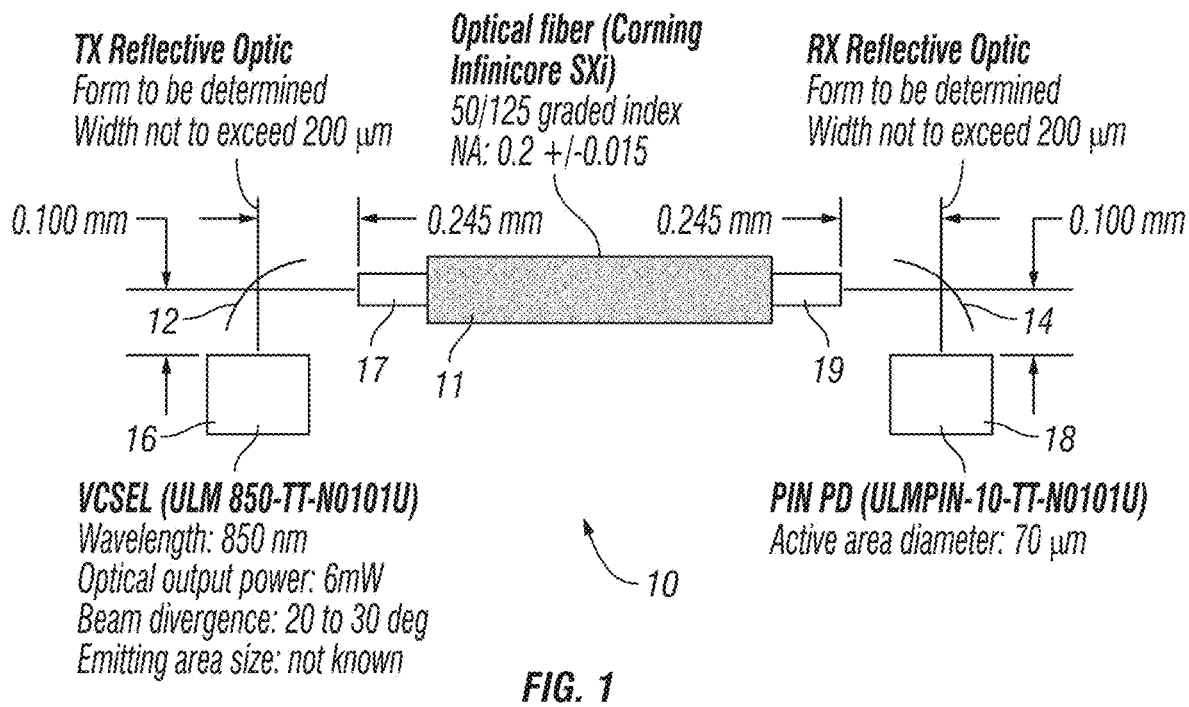
FIG. 1 is a schematic diagram of the configuration of data transmission over an optical fiber, in which the coupling device of the present invention is implemented.

FIG. 1 schematically illustrates the configuration of data link for transmitting information over an optical fiber, in which the coupling device of the present invention is implemented. For simplicity, only some of the basic elements are included in FIG. 1 to explain the invention.

In FIG. 1, the terminating end sections of the optical fibers 10 (input end 17 and output end 19 being bare sections with cladding exposed, without protective buffer and jacket layers 11) are directed at structured reflective surfaces 12 and 14. A transmitter 16 having a light source (e.g., a laser, such as a VCSEL—Vertical Cavity Surface-Emitting Laser) converts electrical signals into optical signals. The collimated light output of the transmitter is directed at the structured reflective surface 12 of a coupling device in accordance with the present invention, which focuses light at the input end 17 of the optical fiber 10. Light signals are transmitted through the optical fiber 10, and output to the structured reflective surface 14 in another coupling device in accordance with the present invention, which focuses the output light to an optical detector (e.g., a PIN photo diode) in a receiver 18. The receiver converts optical signals into electrical signals. By appropriately modulating the electrical signal input to the transmitter 16, data is transmitted via optical signals over the optical fiber 10, and recovered as electrical signals at the receiver 18 corresponding to the input data.

In the illustrated embodiment, the optical fiber may be a 50/125 graded index optical fiber, with a numerical aperture (NA) of 0.2+/−0.015. The structured reflective surfaces 12 and 14 are configured as concave mirrors, having an aperture width not exceeding 250 µm in order to match the standard pitch between two optical fibers in a ribbon cable. The optical axis of the concave mirrors are aligned with the axis of the optical fiber 10. The ends 17 and 19 (flat or angled-polished end faces) of the optical fibers are at an effective distance (along the optical axis) of about 0.245 mm from the respective structured reflective surfaces 12 and 14. The light source in the transmitter 16 and the optical detector in the receiver 18 are at an effective distance (along the optical axis) of about 0.1 mm from the respective structured reflective surfaces 12 and 14. The optical source may be a VCSEL, having 850 nm wavelength, 6 mW optical output power, and 20 to 30 degrees beam divergence. The optical detector may be a PIN photo diode with an active area of about 70 µm diameter.

Figure 2:
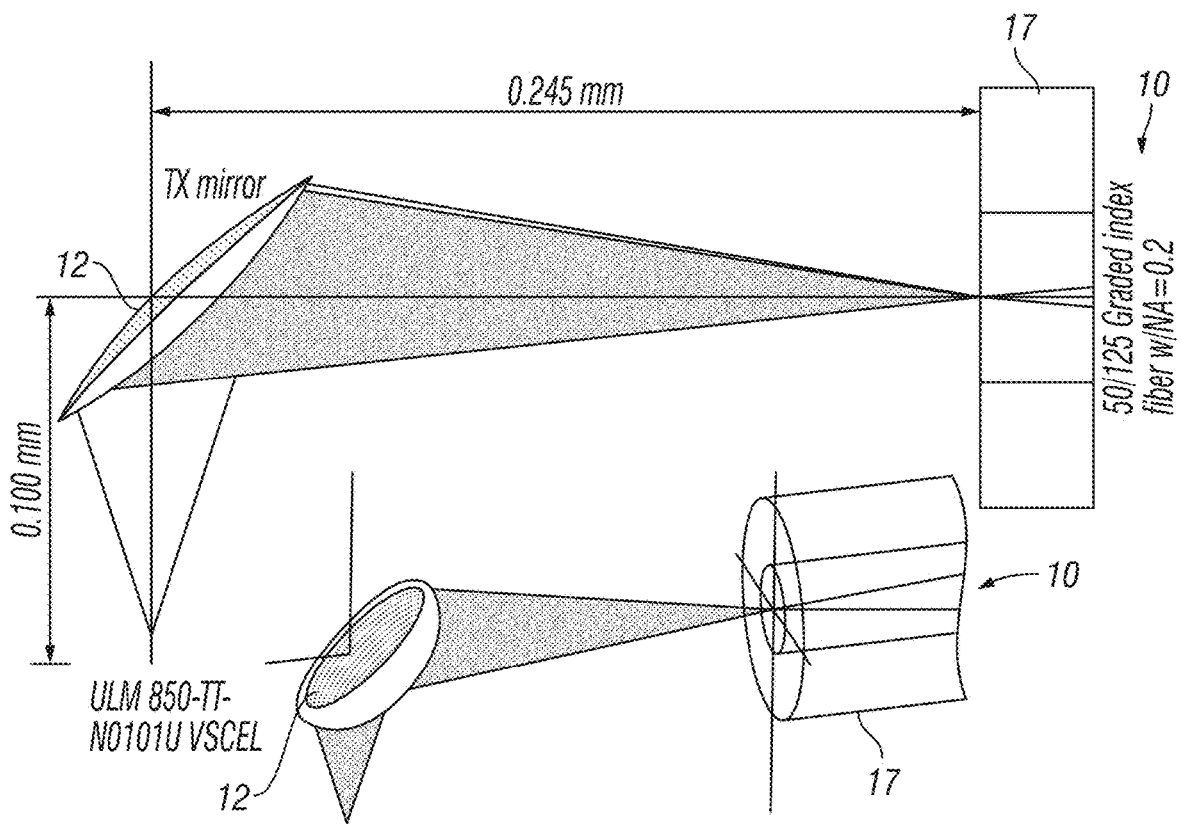
FIG. 2 is a schematic diagram illustrating the optical illumination pattern at the input end of the optical fiber.
Figure 3:
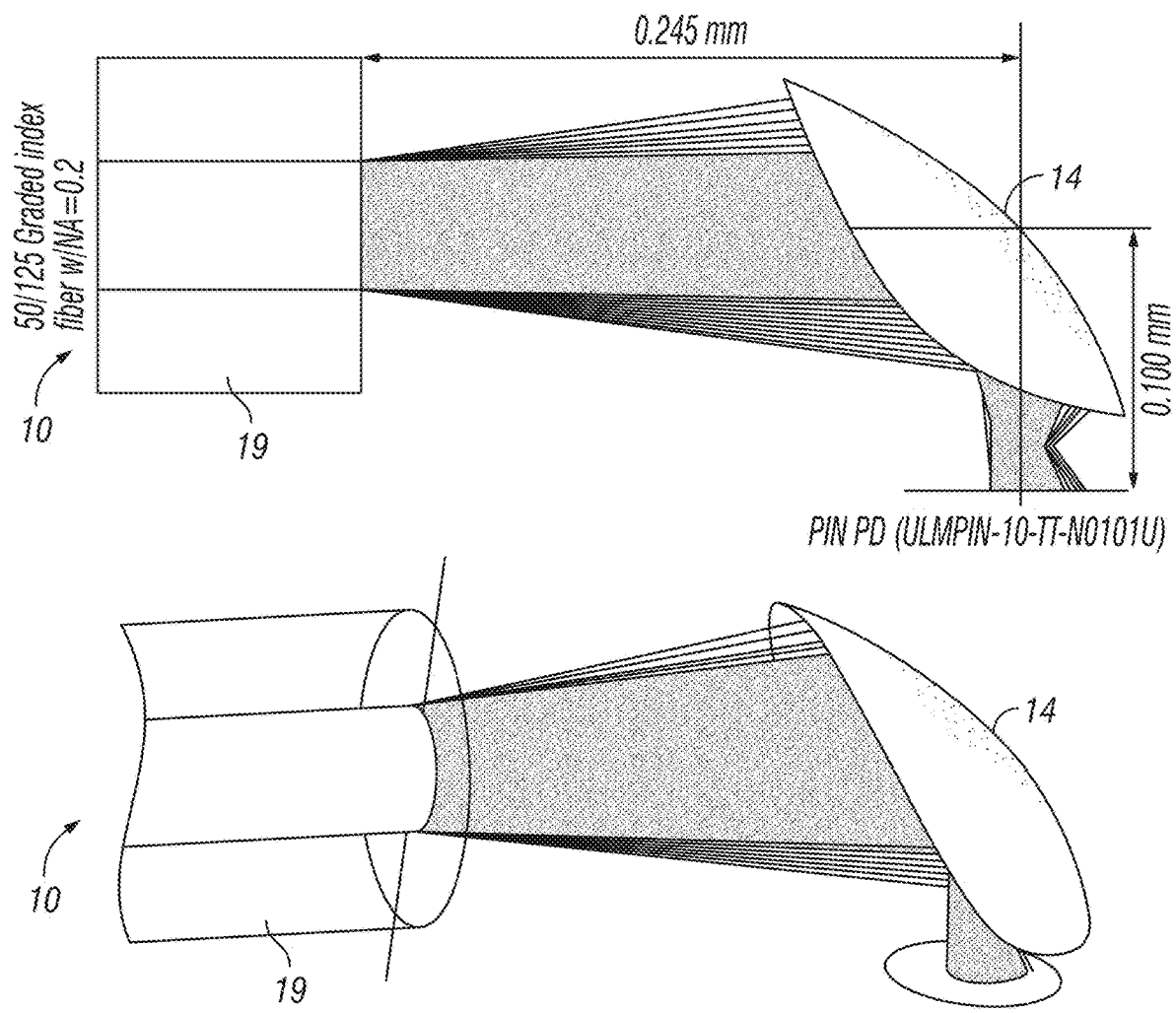
FIG. 3 is a schematic diagram illustrating the optical illumination pattern at the output end of the optical fiber.

FIGS. 2 and 3 further schematically illustrate the optical illumination pattern at the respective input and output of the optical fiber 10.

Figure 4:
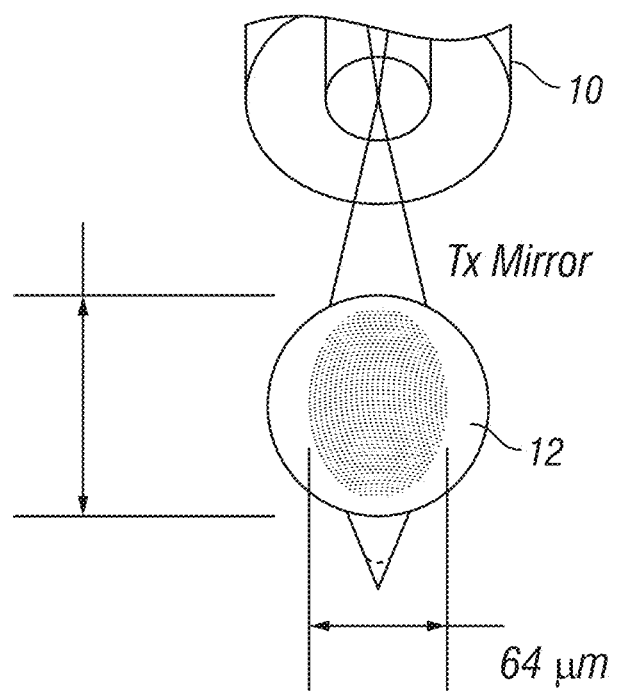
FIG. 4 is a schematic diagram illustrating the footprint of illumination on the structured reflective surfaces at the input end and the output end.
Figure 4:
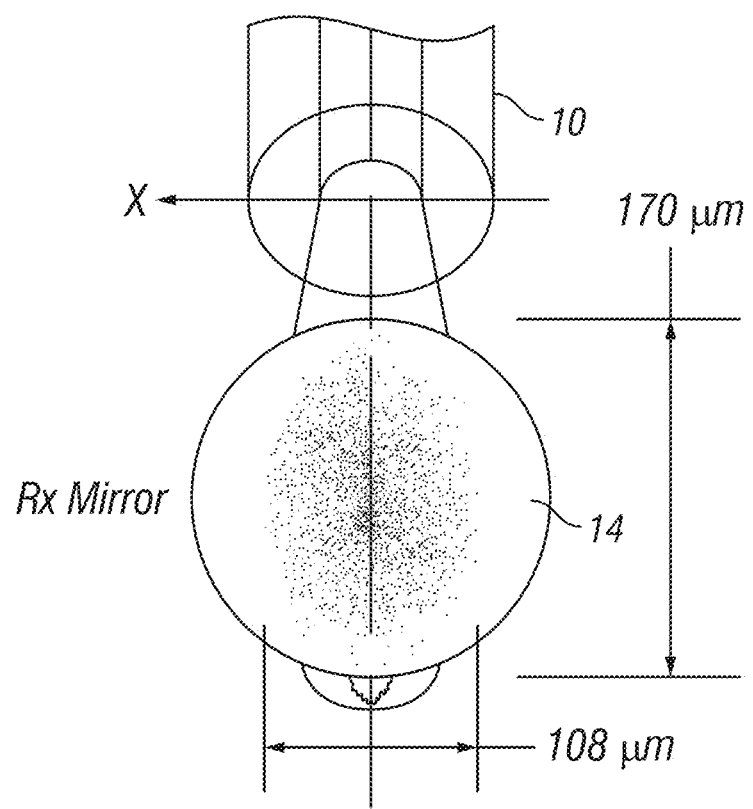

FIG. 4 schematically illustrates the footprint of illumination on the structured reflective surfaces 12 and 14. The concave mirrors defined by these reflective surfaces can have the same shape, but the size of both mirrors is set by larger spot size on the mirror at the output/receiver end. In the illustrated example, the mirrors may be 170 µm, with the spot size at the input/transmitter (Tx) end being 64 µm, and the spot size at the output/receiver (Rx) end being 108 µm.

Figure 5A:
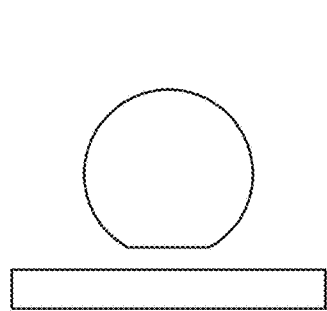
FIGS. 5A and 5B are schematic diagrams illustrating forming of a flat mirror with a spherical punch having a smooth flat surface.
Figure 5B:
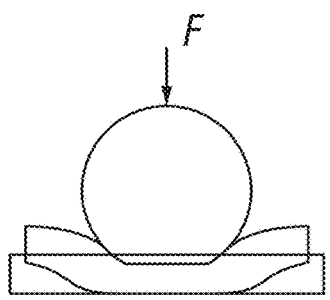
Figure 5C:
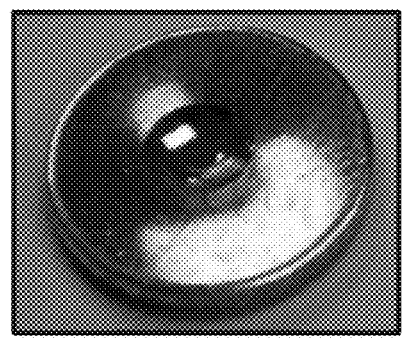
FIG. 5C is a photographic image of a flat mirror formed as a result.

According to one aspect of the present invention, the structured reflective surface may be formed by precision stamping a metal material. FIG. 5 schematically illustrates forming a flat mirror with a spherical punch with a polished flat surface. A precision stamping process and apparatus has been disclosed in U.S. Pat. No. 7,343,770, which was commonly assigned to the assignee of the present invention. This patent is fully incorporated by reference as if fully set forth herein. The process and stamping apparatus disclosed therein may be adapted to precision stamping the features of the coupling device of the present invention (including the structured reflective surface and optical fiber retention structure disclosed below). The stamping process and system can produce parts with a tolerance of at least 1000 nm.

Figure 7A:
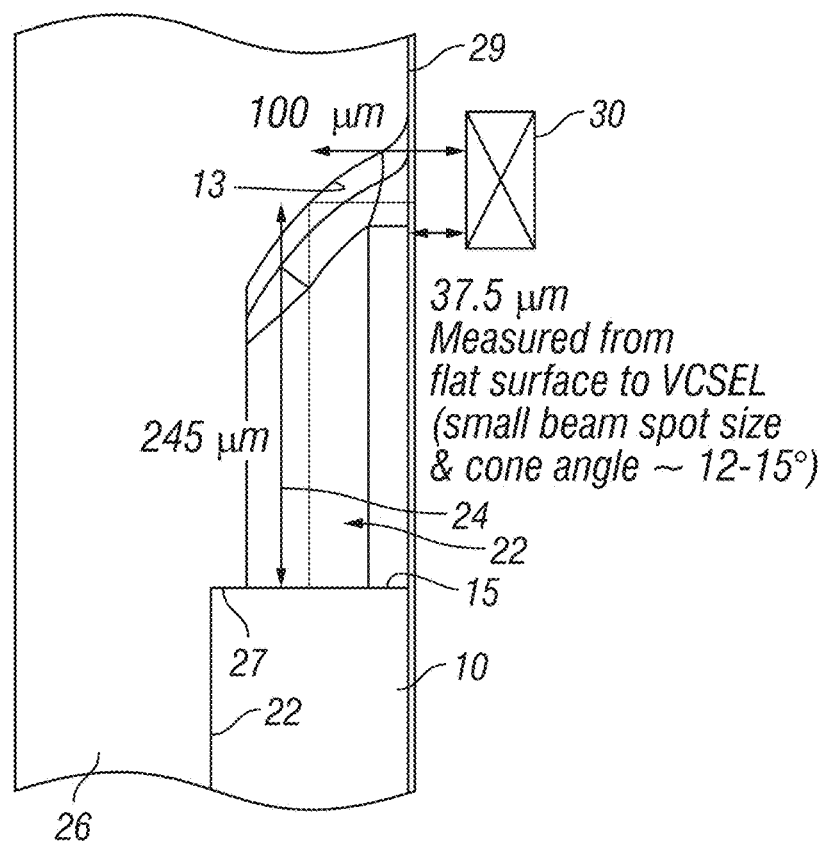
FIG. 7A is a sectional view along a longitudinal axis of the optical fiber.
Figure 7B:
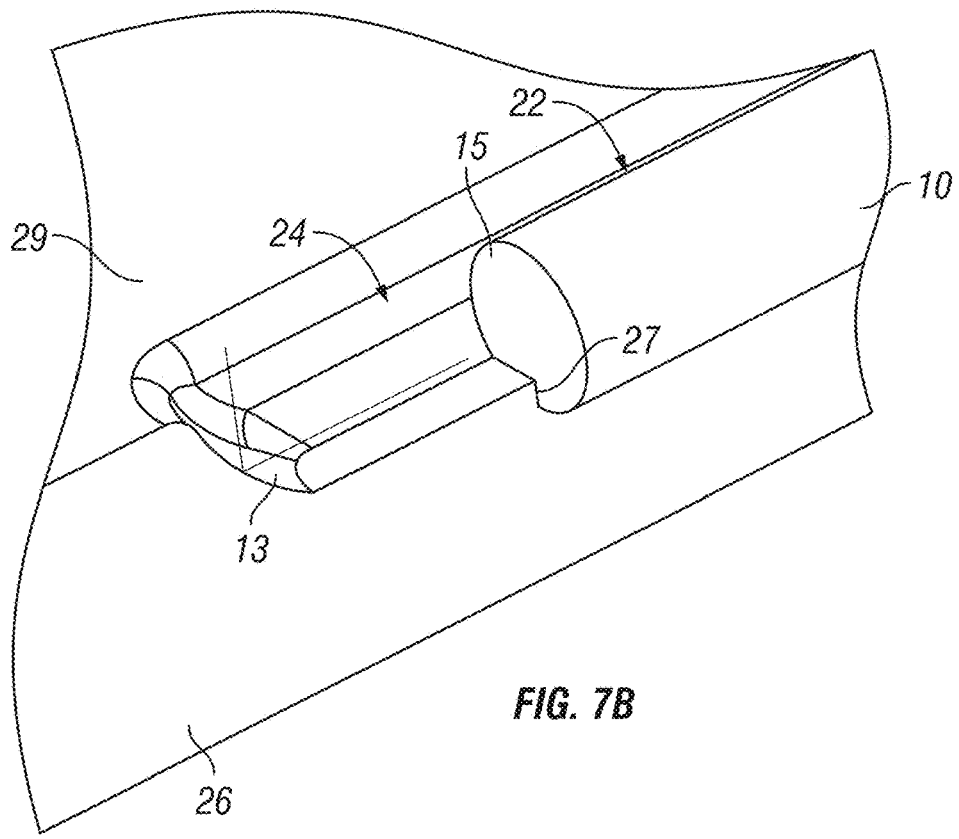
FIG. 7B is a perspective sectional view thereof.

Referring to FIG. 7, in another aspect of the present invention, the coupling device includes an optical fiber retention structure, which securely and accurately aligns the optical fiber 10 with respect to the structured reflective surface 13. In a further aspect of the present invention, the structured reflective surface and fiber retention structure are defined by an open structure, which lends itself to mass production processes such as stamping, which are low cost, high throughput processes. FIG. 7A is a sectional view taken along the longitudinal axis of the optical fiber 10. FIG. 7B is a perspective section view taken along the longitudinal axis of the optical fiber 10. In the illustrated embodiment, the fiber retention structure includes a groove 22 that positively receives the optical fiber in a manner with the end of the optical fiber 10 at a defined distance to and aligned with the structured reflective surface 13. The location and orientation of the structured reflective surface 13 is fixed in relation to the fiber retention structure. In the illustrated embodiment, the fiber retention structure and the structured reflective surface are defined on the same (e.g., monolithic) base 26 of the coupling device. In an alternate embodiment (not illustrated), the fiber retention structure and the structure reflective surface are defined on separate structures that are coupled together to form the coupling device. The groove 22 has a section 24 defining a space between the end face 15 of the optical fiber 10. In the illustrated embodiment, this section 24 has a similar width but a shallower bottom as the remaining sections of the groove 22. The section 24 defines a shoulder 27 that provides a stop against which a portion (end) of the end face 13 of the optical fiber 10 is butted. Accordingly, a distance (e.g., 245 µm) along the optical axis is defined between the end face 15 and the structured reflective surface 13. In the illustrated embodiment, the optical fiber is completely received in the groove 22, with the exterior surface of the optical fiber 22 flush with the top surface 29 of the base 26. Given an optical fiber having a diameter of 125 µm, and a VCSEL light source 30 at an effective distance (e.g., from the flat surface of the VCSEL 30 along the optical axis) of 100 µm from the structured reflective surface 13, the distance of the flat surface of the VCSEL from the top surface 29 of the base 26 would be about 37.5 µm.

The groove 22 is structured to securely retain the fiber 10 (bare section with cladding exposed, without protective buffer and jacket layers) by clamping the fiber 10, e.g., by a mechanical or interference fit (or press fit). The interference fit assures that the fiber 10 is clamped in place and consequently the position and orientation of the fiber 10 is set by the location and longitudinal axis of the groove 22. In the illustrated embodiment, the groove 22 has a U-shaped cross-section that snuggly receive the bare optical fiber 10 (i.e., with the cladding exposed, without the buffer and protective layers). The sidewalls of the groove 22 are substantially parallel, wherein the opening of the groove may be slightly narrower than the parallel spacing between the sidewalls (i.e., with a slight C-shaped cross-section) to provide additional mechanical or interference fit for the fiber 10. Further details of the open groove structure can be found in copending U.S. patent application Ser. No. 13/440,970 filed on Apr. 5, 2012, which is fully incorporated by reference herein. The base 26 having the groove 22 is effectively a one-piece open ferrule supporting the optical fiber 10 in precise location and alignment with the structured reflective surface 13. The location of the structured reflective surface 13 is fixed with respect to the groove 22 and the shoulder 27, and hence fixed with respect to the end face of the optical fiber 10. The structured reflective surface 13 is not supported on a moving part and does not involve any moving part.

In one embodiment, the base 26 of the coupling device is formed of a metal material. In one embodiment, the metal material may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). For reflectivity, the base 26 may be formed of a metal such as aluminum or copper, which offer higher optical reflectivity. The reflectivity can also be achieved by plating materials such as gold, silver, nickel, aluminum, etc. onto the body 26. Alternatively, the material may be a hard plastic or other hard polymeric material. The above disclosed open structure of the coupling device having the structured reflective surface and the fiber retention structure lends itself to mass production processes such as stamping, which are low cost, high throughput processes. A precision stamping process and apparatus has been disclosed in U.S. Pat. No. 7,343,770, which was commonly assigned to the assignee of the present invention. This patent is fully incorporated by reference as if fully set forth herein. The process and stamping apparatus disclosed therein may be adapted to precision stamping the ferrules of the present invention.

Figure 6:
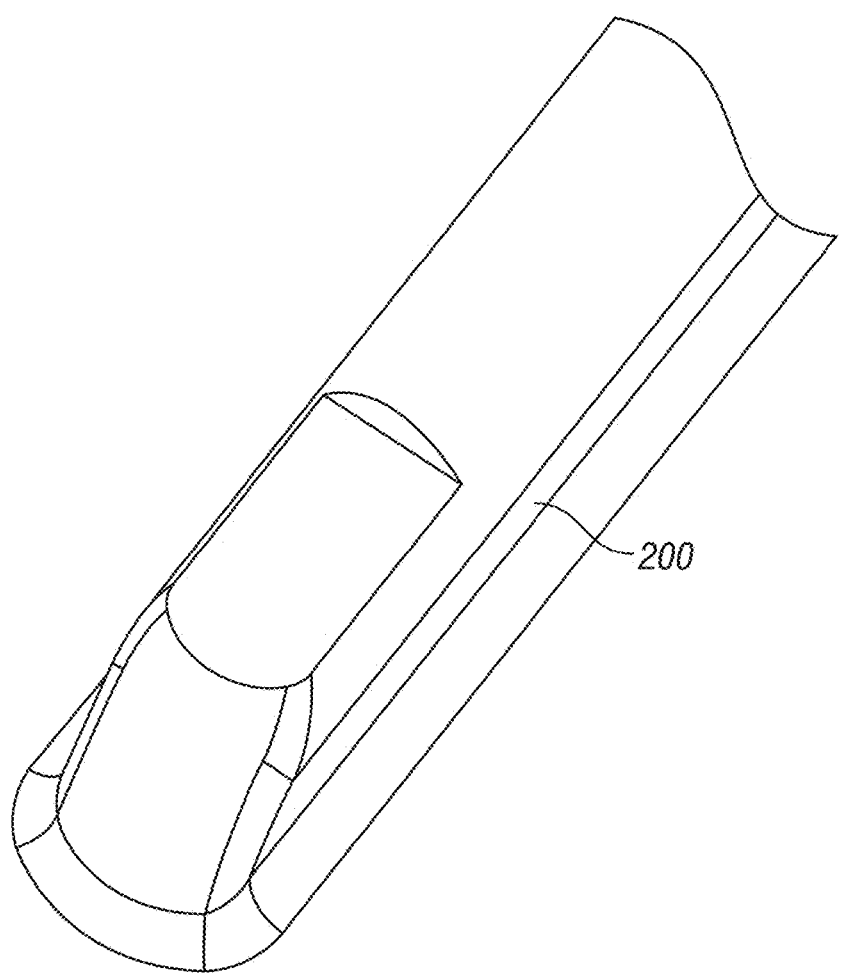
FIG. 6 is a perspective view of the punch geometry for stamping a groove and a structured surface profile in the coupling device.

FIG. 6 illustrates a punch 200 configured for stamping the groove 22 and structured reflective surface 13 in the base 26. The punch 200 has a convex surface profile that is essentially the inverse of the structured reflective surface and the groove. The surface profile of the punch 200 conforms to the features to be stamped.

Figure 8A:
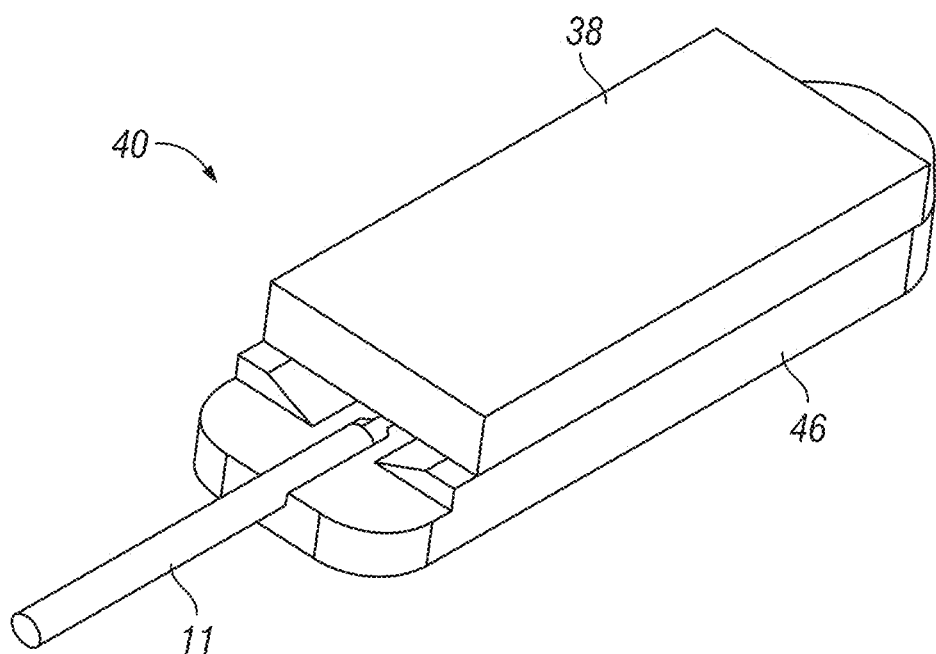
FIG. 8A is a perspective view of an integrated transmitter/receiver module in accordance with one embodiment of the present invention.
Figure 8B:
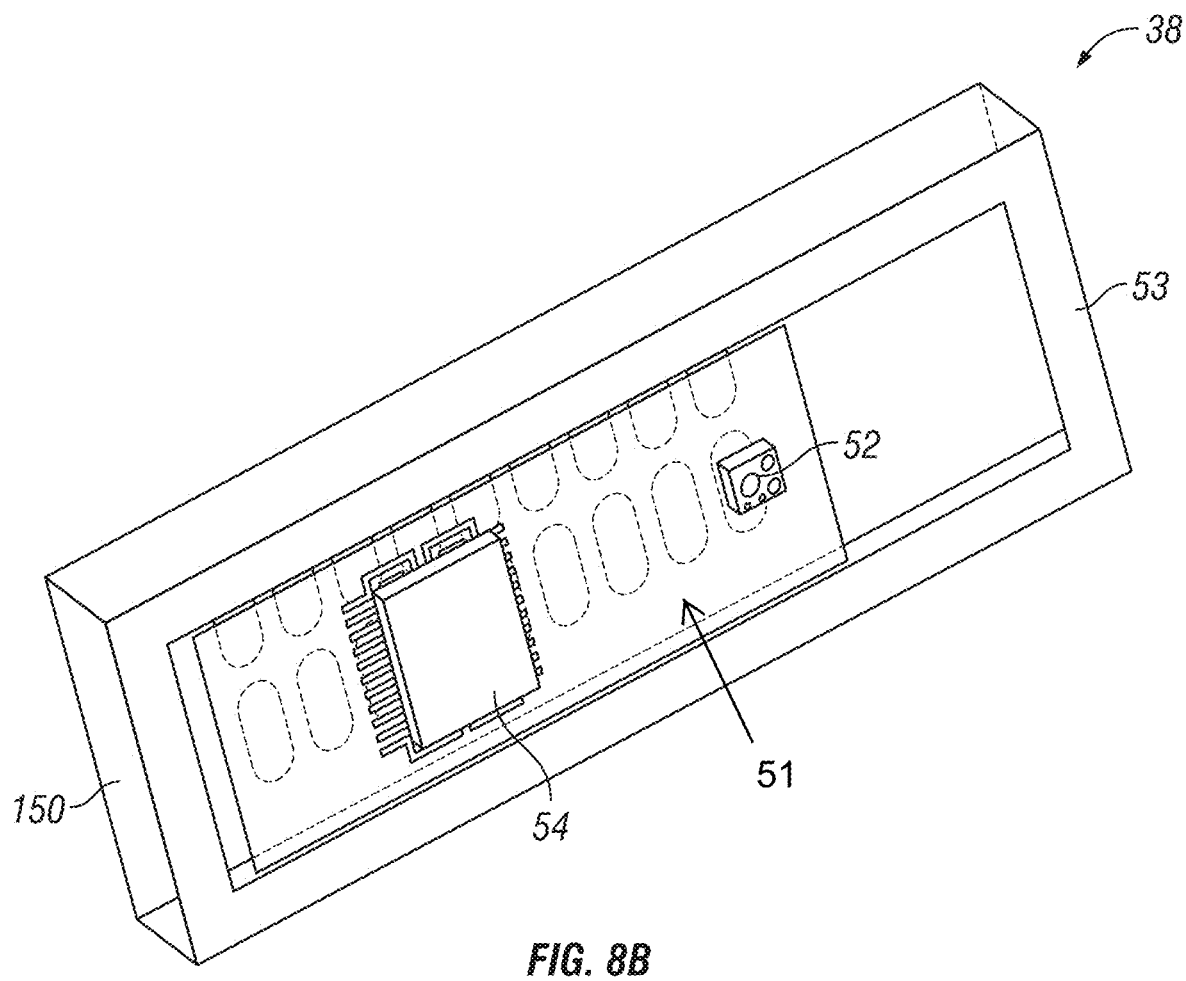
FIG. 8B is a perspective view of the transmitter in accordance with one embodiment of the present invention.

FIG. 8A illustrates an embodiment of an integrated transmitter/receiver module 40 comprising a transmitter/receiver 38 attached to an optical coupling device 39, with the structured reflective surface in the coupling device aligned to the light source/detector in the transmitter/receiver. FIG. 8B illustrates an embodiment of a transmitter/receiver 38. The transmitter/receiver 38 includes a base 150 supporting a circuit board 51 that on which a light source/detector 52 (e.g., a VCSEL/a photodiode) and associated control circuit (e.g., an IC chip) are mounted. A bonding surface 53 is defined at the perimeter of the transmitter/receiver 38.

Figure 8C:
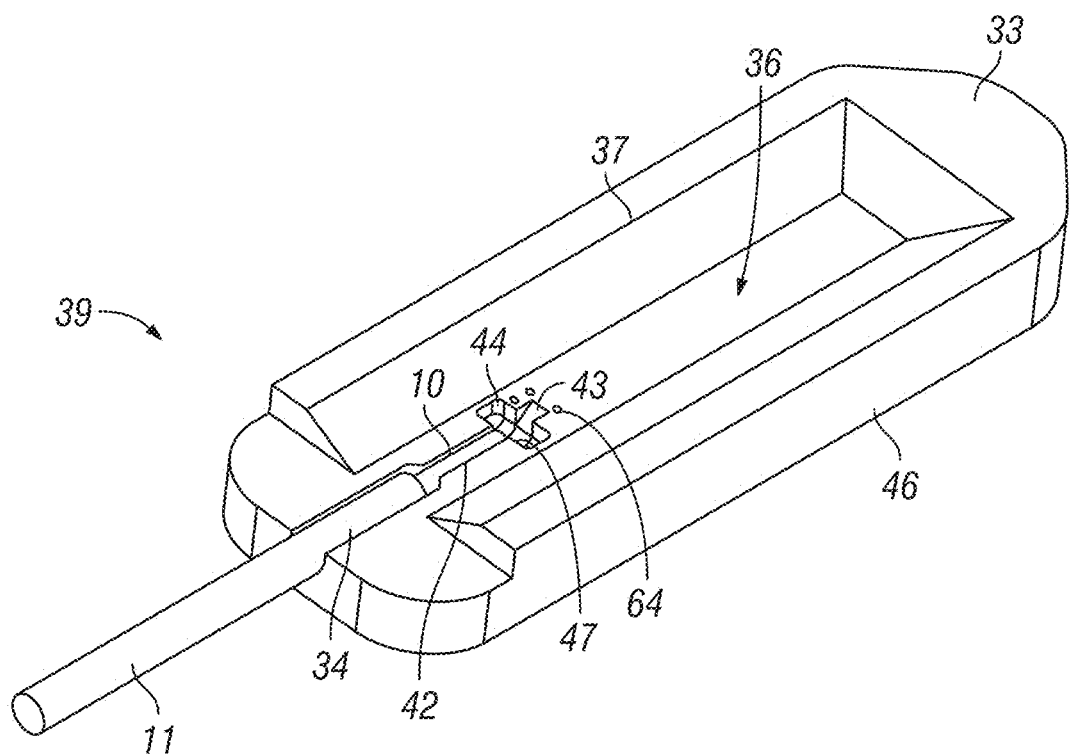
FIG. 8C is a perspective view of the receiver in accordance with one embodiment of the present invention.

FIG. 8C illustrates the internal open structure of the coupling device 39, which is quite similar to the open structure of the coupling device discussed above. Essentially, the coupling device 39 has a base 46 having a groove 42 and structured reflective surface 43 defined therein similar to the groove 22 and structured reflective surface 13 defined in base 26 in the earlier embodiment of FIGS. 6 and 7 discussed above. In this embodiment, the section 44 of the groove 22 is wider, but nonetheless has a depth defining a shoulder 47 to precisely position the end face of the fiber 10. A wider groove 34 is provided on the base 46 to receive the thicker section of the fiber having the protective layer 11. Epoxy may be applied to secure the protective layer 11 in the groove 34.

In this embodiment, the base 46 has raised sidewalls 37 defining a cavity 36 in which the structured reflective surface 43 and grooves are located. The cavity 36 provides space for accommodating the height of the IC chip mounted on the circuit board 51. The height of the sidewalls 37 defines the distance between the light source/detector in the transmitter/receiver 38 and the structured reflective surface 43 in the coupling device 39. Referring also to FIG. 7A, given an optical fiber having a diameter of 125 µm, and the flat output surface of the VCSEL along the optical axis of 100 µm from the structured reflective surface 43, the height of the sidewalls 37 defines the distance of the flat output surface of the VCSEL from the surface of the cavity 36 (corresponding to the top surface 29 of the base 26 in FIG. 7A) to be about 37.5 µm.

As one can appreciate, in the module 40, given the fixed structured reflective surface and the fiber retention structure are precisely defined on the same coupling device, by aligning the light source in the transmitter or the light detector in the receiver to the structured reflective surface in the coupling device, the light source/detector would be precisely aligned to the input/output end of the optical fiber.

From another perspective, the above described combination of transmitter/receiver and coupling device may be perceived to be an integrated transmitter/receiver module that includes a structured reflective surface and an integral coupling structure that aligns an optical fiber to the structured reflective surface.

The coupling device 39 may be stamped from a malleable metal material, as discussed earlier. The top surface 33 of the sidewalls 37 provides a bonding area for attaching to the transmitter/receiver 38. The transmitter/receiver 38 may be attached to the coupling device 39 by glue, epoxy, solder or welding. In one embodiment, the transmitter/receiver 38 may be hermetically sealed against the coupling device 39, for example, by laser welding, soldering, or blazing. The transmitter/receiver 38 and the coupling device can be manufactured and tested separately prior to assembly.

Figure 9:
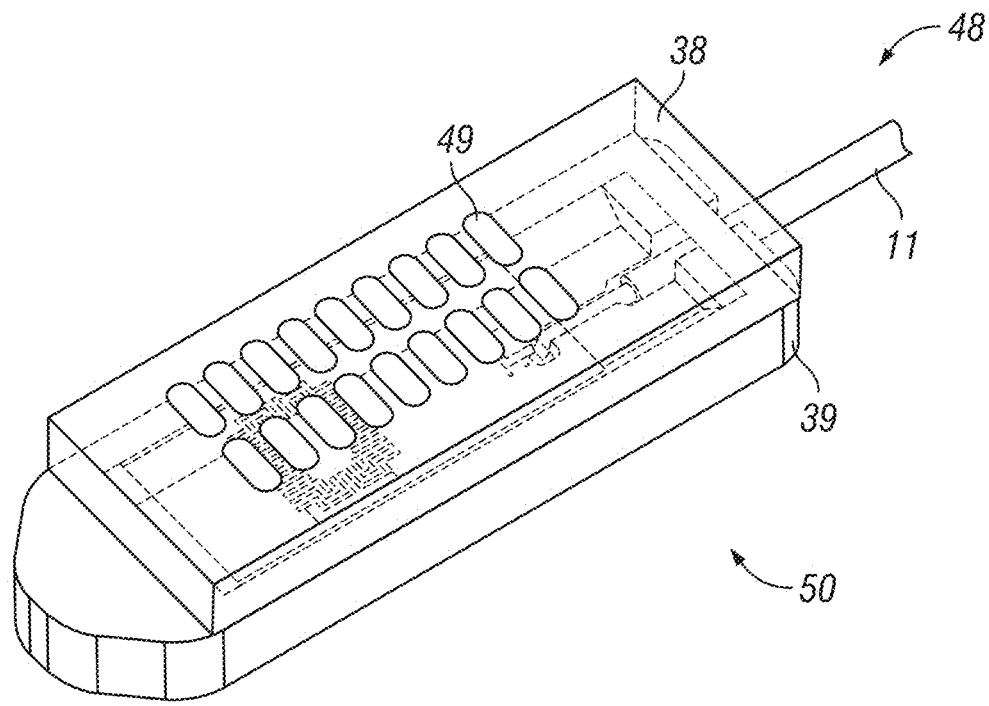
FIG. 9 is a perspective view of an active optical cable (AOC) in accordance with one embodiment of the present invention.

In another aspect of the present invention, an optical fiber is structured as an active optical cable (AOC), which is a cable known in the art to have a transmitter at one terminal end of the optical fiber for electrical-to-optical conversion, and a receiver at another terminal end of the optical fiber for optical-to-electrical conversion. FIG. 9 illustrates an embodiment of an AOC 48 that adopts the transmitter/receiver module 50 in accordance with the present invention. (Only one end of the AOC is shown in FIG. 9; the other end is similar in structure, wherein one end is a transmitter module having a laser or light source and another end is a receiver module having a photonic detector.) The structure of the module 50 is similar to the structure of the module 40 in the earlier embodiment of FIG. 8, with the exception of electrical contact pads 49 provided on the outside of the transmitter/receiver 39. The electrical contact pads 49 provide external electrical access to the control circuit 54 inside the module 50.

Referring also to the schematic drawing of FIG. 1, the AOC 48 essentially includes the components illustrated in FIG. 1. The AOC 48 includes an optical fiber (bare fiber 10 and protective layers), a transmitter module 50 corresponding to the combination of transmitter 16 and a coupling device having the structured reflective surface 12 and a fiber retention structure discussed above which supports the end 17 of the fiber 10, a receiver module 50 corresponding to the combination of receiver 18 and a coupling device having the structured reflective surface 14 and a fiber retention structure discussed above which supports the end 19 of the fiber 10.

Figure 10A:
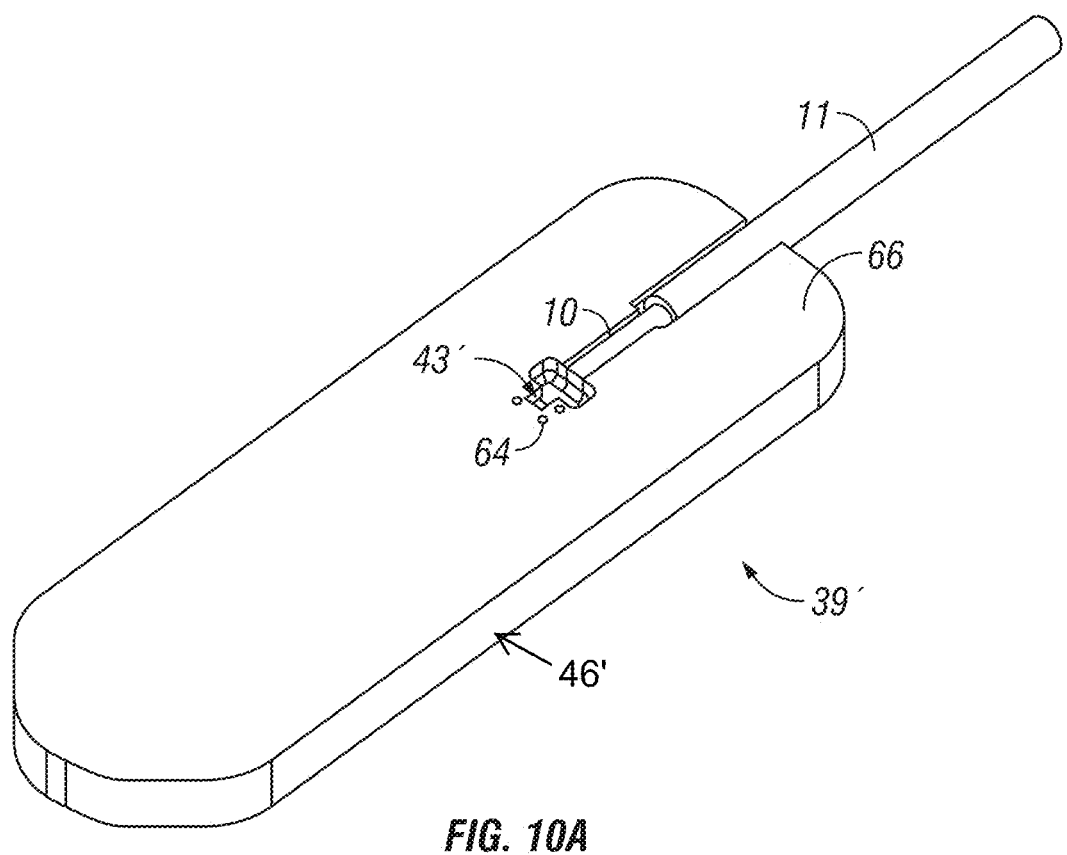
FIG. 10A is a further embodiment of a coupling device having an alignment mark.
Figure 10B:
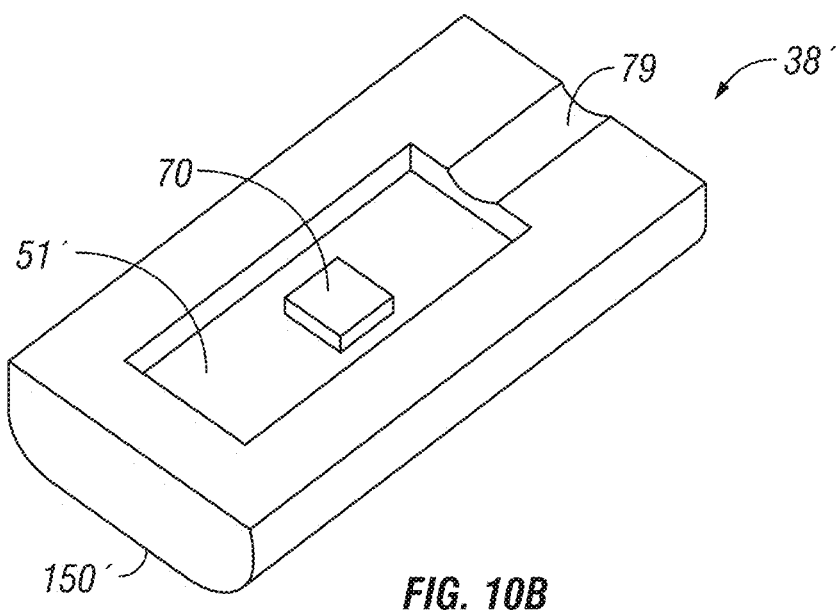
FIG. 10B is a further embodiment of a transmitter/receiver.
Figure 11A:
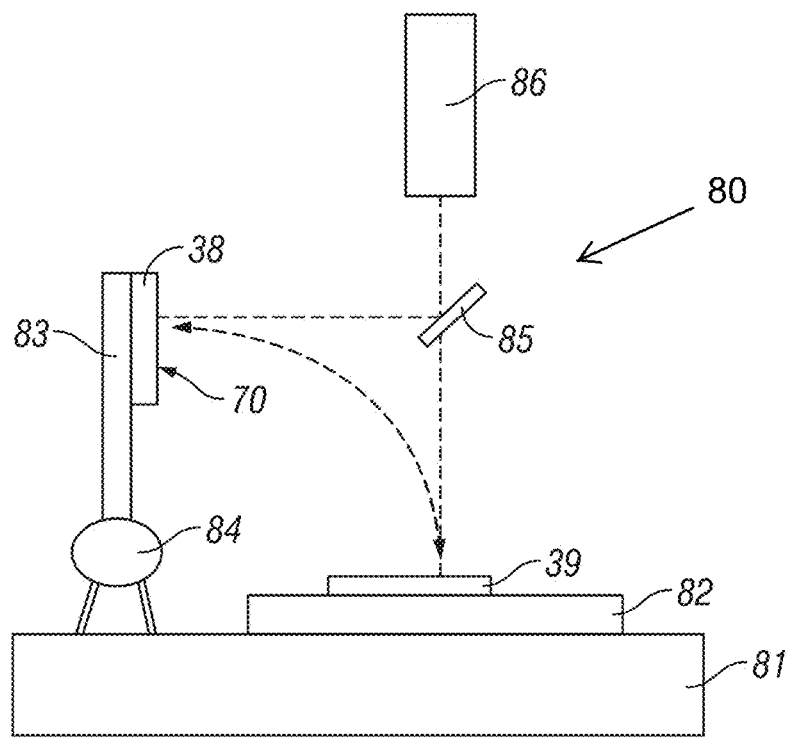
FIG. 11A schematically illustrates an assembly stand and assembling process including alignment, in accordance with one embodiment of the present invention.
Figure 11B:
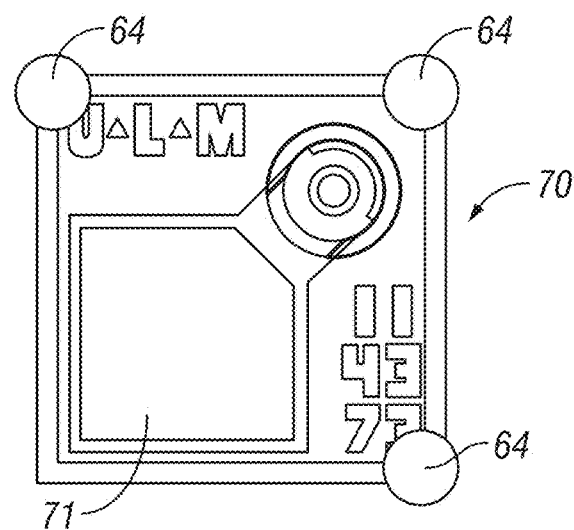
FIG. 11B illustrates top view of a VCSEL provided with alignment dots in accordance with one embodiment of the present invention.

FIGS. 10 and 11 illustrates an embodiment of an assembling process, including precise alignment of the transmitter/receiver to the coupling device by superimposing complementary alignment marks provided on the transmitter/receiver and the coupling device. FIG. 10A is another embodiment of a coupling device 46' which is similar to FIG. 8C, except omitting raised sidewalls of the coupling device. An alignment mark is provided on the top surface of the base 46' of the optical coupling 39'. The base 46' precisely aligns the optical fiber 10 held in a groove, with respect to the structured reflective surface 43'. The alignment mark comprises three dots 64 (which may be dimples produced by the stamping process forming the groove and structured reflective surface) arranged in an L-configuration around the structured reflective surface 43', thus providing spatial alignment in two axis/directions. The alignment dots 64 are spaced so that they correspond to certain features on the light source/detector on the transmitter/receiver. For example, FIG. 11B represents the top view of the square top surface 72 of a VCSEL 70. The VCSEL 70 has an output area 71 that is offset closer to one corner of the square top surface 72. Accordingly, by placing the three dots 64 on the top surface 66 adjacent to two sides of the structured reflective surface 43', and further with the dots 64 spaced to correspond to the corners of the square top surface 72 of the VCSEL 70, the output area 71 can be aligned to the structured reflective surface 43' by aligning the dots 64 to the corners of the square top surface 72 of the VCSEL 70. Similar alignment of the photo diode in a receiver to a structured reflective surface defined on a coupling device, by providing similar alignment marks on the top surface of the coupling device in a similar manner as discussed above. Referring back to FIG. 8C, similar alignment mark (dots 64) is provided on the bottom of the cavity around the structured reflective surface 43.

FIG. 10 illustrates another embodiment of the transmitter 38'. The base 150' has raised sidewalls having a groove relief 79 to accommodate the extra thickness of the protective layer 11 of the optical fiber 10. The VCSEL 70 is mounted on a circuit board 51'.

Figure 11C:
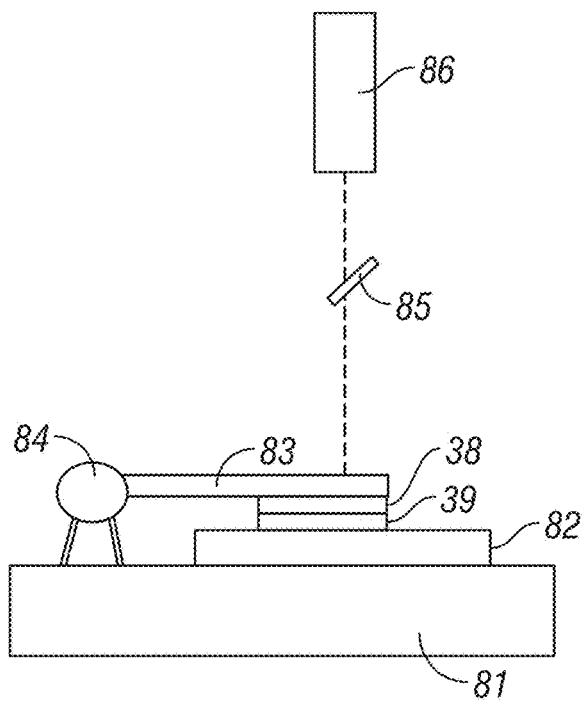
FIG. 11C illustrates the rotary arm of the assembly stand swung to place a transmitter on top of a coupling device, in accordance with one embodiment of the present invention.

FIG. 11A schematically illustrates an assembly stand 80 including an alignment system that adopts the above described alignment marks. The assembly 80 stand includes a base 81 supporting an alignment stage 82 (e.g., X-Y translations in the X-Y horizontal plane and orthogonal Z-axis out of plane, and rotation about the Z-axis). The assembly stand 80 further includes a rotary arm 83 having a pick-and-place head, which is supported to rotate about a bearing 84 to swing the arm onto over the alignment stage 82. The coupling device 39' (or the coupling device 39 in FIGS. 8 and 9) is supported on the alignment stage 82, with the alignment dots 64 in a horizontal plane. The transmitter/receiver 38' (or the transmitter/receiver 38 in FIGS. 8 and 9) is support by the pick-and-place head of the rotary arm 83. With the rotary arm 83 in a vertical position as shown in FIG. 11A, the square top surface 72 of the VCSEL 70 is in a vertical plane. The axis orthogonal to the plane of the square top surface 72 of the VCSEL 70 is orthogonal to the axis orthogonal to the plane of the alignment dots 64. Using a camera 86 and a beam splitter 85 provides for simultaneous imaging of both the square top surface 72 of the VCSEL 70 and the alignment dots 64. By actuating the alignment stage 82, the image of the alignment dots 64 can be brought into alignment with the image of the square top surface 72, as shown in FIG. 11B. The rotary arm 83 is then swung to place the transmitter 38' on top of the coupling device 39', as shown in FIG. 11C. The transmitter 38' and the coupling device 39' are joined by, for example, laser welding, laser assisted soldering, or infrared soldering.

The coupling device in accordance with the present invention overcomes many of the deficiencies of the prior art, which provides ease of use and high reliability with low environmental sensitivity, and which can be fabricated at low cost. The inventive coupling device may be configured to support a single or multiple fibers, for optical input, optical output or both (for bi-direction data communication).

While the embodiments above are described in reference to a coupling device for a single optical fiber, it is well within the scope and spirit of the present invention to adapt the above disclosed coupling device structures for multiple optical fibers by providing parallel grooves in the coupling device.

For all the above described embodiments, from another perspective, the combination of transmitter/receiver and coupling device may be instead perceived to be an integrated transmitter/receiver module that includes one or more light sources/detectors, an integral coupling structure that includes one or more structured reflective surfaces and aligns one or more optical fibers to the structured reflective surfaces.

In all the above described embodiments, the structured reflective surface may be configured to be flat, concave or convex, or a combination of such to structure a compound reflective surface. In one embodiment, the structured reflective surface has a smooth (polished) mirror surface. It may instead be a textured surface that is reflective. The structured reflective surface may have a uniform surface characteristic, or varying surface characteristics, such as varying degree of smoothness and/or textures across the surface, or a combination of various regions of smooth and textured surfaces making up the structured reflective surface. The structured reflective surface may have a surface profile and/or optical characteristic corresponding to at least one of the following equivalent optical element: mirror, focusing lens, diverging lens, diffraction grating, or a combination of the foregoing. The structure reflective surface may have a compound profile defining more than one region corresponding to a different equivalent optical element (e.g., a central region that is focusing surrounded by an annular region that is diverging). In one embodiment, the structured reflective surface is defined on an opaque material that does not transmit light through the surface.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A process of making a coupling device for physically and optically coupling an optical fiber for routing optical signals, comprising:

forming a base having a structured reflective surface and an optical fiber retention structure, such that an end face of the optical fiber is located at a predetermined distance from the structured reflective surface along the axis of the optical fiber, wherein the optical fiber retention structure accurately aligns the optical fiber with respect to the structured reflective surface along an optical path, so that output light from the optical fiber can be reflected by the structured reflective surface to outside the coupling device or input light from outside the coupling device incident at the structure reflective surface can be reflected towards the optical fiber, wherein the optical fiber retention structure comprises a groove provided on the base, wherein the groove is aligned with respect to the structured reflective surface, characterized in that the base is made of a malleable metal material, and the structured reflective surface and the optical fiber retention structure comprising the groove are formed by stamping the malleable metal material to integrally define the structured reflective surface and the optical fiber retention structure on the base.

2. The process of making a coupling device as in claim 1, wherein the groove includes a shoulder that defines a stop to which a portion of the end face of the optical fiber can butt against to define the predetermined distance between the end face of the optical fiber and the structured reflective surface.

3. The process of making a coupling device as in claim 1, wherein the structured reflective surface comprises a curved surface profile.

4. The process of making a coupling device as in claim 3, wherein the curved surface profile of the structured reflective surface is concave.

5. The process of making a coupling device as in claim 1, wherein stamping the malleable metal material integrally defines the structured reflective surface and the optical fiber retention structure on the base with a tolerance of at least 1000 nm.

6. The process of making a coupling device as in claim 1, wherein the groove is an open groove.

7. The process of making a coupling device as in claim 1, wherein the coupling device is structured to physically and optically couple the optical fiber to an optical receiver or an optical transmitter.

8. A process of making a transmitter module or a receiver module, comprising:
   providing a coupling device made by the process as in claim 1; and
   supporting a light source in the case of a transmitter module, or a light detector in the case of a receiver module, with respect to the structured reflective surface, wherein the light source produces the input light to be reflected by the structured reflective surface towards the optical fiber, or the light detector receives the output light from the optical fiber which is reflected by the structured reflective surface.

9. The process of making a transmitter module or a receiver module as in claim 8, wherein the light source is part of an optical transmitter, and the light detector is part of an optical receiver.

10. The process of making a transmitter module or a receiver module as in claim 8, wherein the structured reflective surface in the coupling device comprises a curved surface profile.

11. The process of making a transmitter module or a receiver module as in claim 10, wherein the curved surface profile of the structured reflective surface is concave.

12. The process of making a transmitter module or a receiver module as in claim 8, wherein stamping the malleable metal material integrally defines the structured reflective surface and the optical fiber retention structure on the base of the coupling device with a tolerance of at least 1000 nm.

13. The process of making a transmitter module or a receiver module as in claim 8, wherein the groove is an open groove.

14. A process of making an active optical cable, comprising:
   providing an optical fiber cable comprising an optical fiber for routing optical signals having a first end and a second end;
   providing a transmitter module made by the process as in claim 8, wherein the coupling device in the transmitter module physical and optically couples the first end of the optical fiber to the light source in the transmitter module; and
   providing a receiver module made by the process as in claim 8, wherein the coupling device in the receiver module physically and optically couples the second end of the optical fiber to the light detector in the receiver module.

15. The process of making an active cable as in claim 14, wherein the structured reflective surface in the coupling device comprises a curved surface profile.

16. The process of making an active cable as in claim 15, wherein the curved surface profile of the structured reflective surface is concave.

17. The process of making an active cable as in claim 14, wherein stamping the malleable metal material integrally defines the structured reflective surface and the optical fiber retention structure on the base of the coupling device with a tolerance of at least 1000 nm.

18. The process of making an active cable as in claim 14, wherein the groove is an open groove.

* * * * *